United States Patent [19]

Fischer et al.

[11] 4,050,044
[45] Sept. 20, 1977

[54] ELECTRICAL SWITCH

[75] Inventors: Karl Fischer, Oberderdingen; Robert Kicherer, Knittlingen, both of Germany

[73] Assignee: E.G.O. Elektro-Geraete Blanc und Fischer, Germany

[21] Appl. No.: 498,950

[22] Filed: Aug. 20, 1974

[30] Foreign Application Priority Data

Aug. 30, 1973 Germany .............................. 2343833
May 10, 1974 Germany .............................. 2422684

[51] Int. Cl.² .......................................... H01H 61/01
[52] U.S. Cl. .................................... 337/137; 200/76; 337/389
[58] Field of Search ............... 337/26, 41, 109, 131, 337/132, 135, 137, 329, 338, 399, 466, 123, 125, 391; 219/512, 461, 462; 200/67 DA, 76

[56] References Cited

U.S. PATENT DOCUMENTS

| | | | |
|---|---|---|---|
| 2,518,255 | 8/1950 | Roesler | 200/76 |
| 2,598,856 | 6/1952 | Swan et al. | 200/76 |
| 2,608,628 | 8/1952 | Dietrich | 200/76 |
| 2,838,645 | 6/1958 | Welch | 337/41 X |
| 3,746,838 | 7/1973 | Dougmand | 219/512 |

Primary Examiner—Harold Broome
Attorney, Agent, or Firm—Brumbaugh, Graves, Donohue & Raymond

[57] ABSTRACT

An electrical switch comprising a housing, and spring supported in the housing. The spring is made from resilient, flat material and carries a contact at each end thereof, each contact being adapted to engage a respective counter-contact carried by the housing. Two spring tongues are formed on the spring and are supported on support bearings under stress so that a contact can be snapped out of engagement with the corresponding counter-contact upon actuation of an actuating member which engages the spring. Preferably the actuating member is temperature-sensitive or is connected to a temperature-sensitive member so that the switch may be used as a temperature-sensitive switching element, thermal relay or thermostat.

33 Claims, 16 Drawing Figures

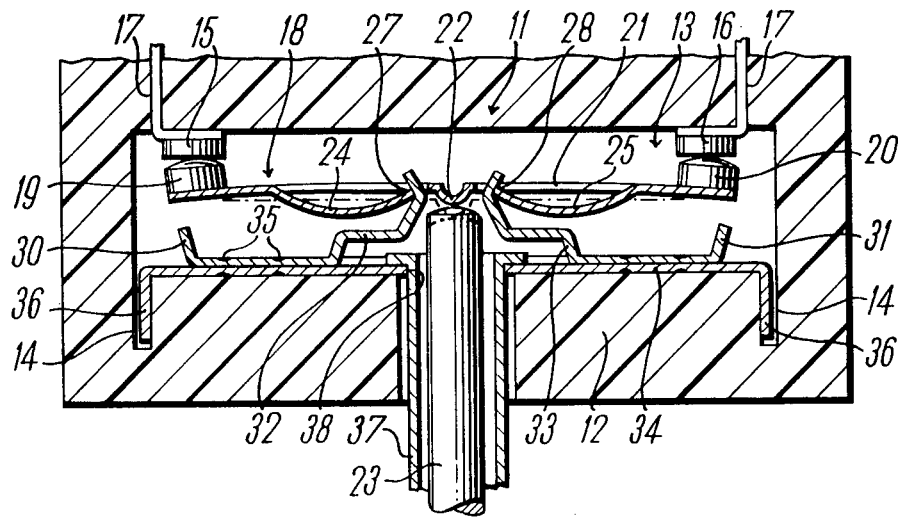
Fig.1
Fig.2
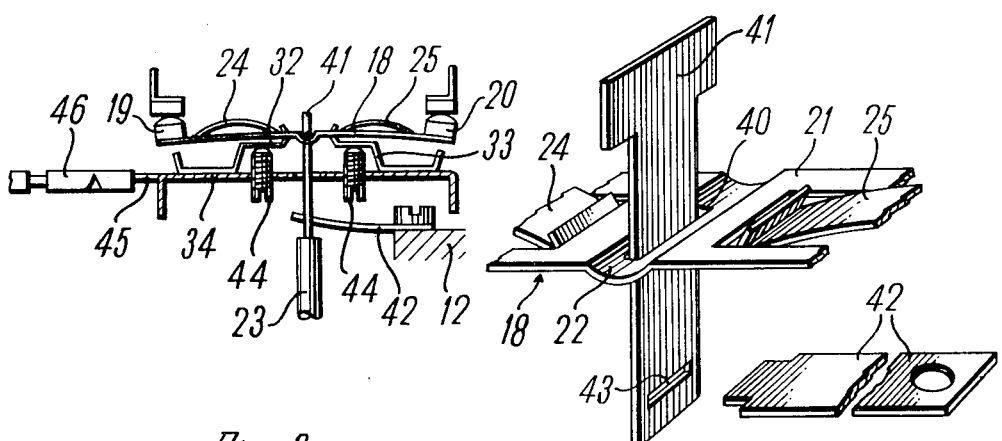
Fig.3
Fig.4

ELECTRICAL SWITCH

The present invention relates to an electrical switch.

It is an object of the invention to provide an electrical switch which has a snap action and in which only a small travel of the actuating member is necessary for the switch to change state.

In accordance with the present invention there is provided an electrical switch operable by means of an actuating member, comprising a spring made from resilient, flat material, the spring carrying at least one contact on each of its two ends, wherein the spring has two spring tongues which are directed in opposite directions relative to one another and whose ends, supported under stress in relative support bearings are directed towards one another.

It has been found that the actuating member need only travel approximtely 1/100 mm to change the state of a switch of the invention.

A switch of the invention can be used particularly advantageously in temperature-dependent switching devices or regulating devices if the actuating member is a rod which has a low coefficient of thermal expansion and which extends through an expansion sleeve having a high coefficient of thermal expansion and acts directly upon the spring without transmission. Only a single spring is required to carry two contacts which can switch simultaneously or be staggered relative to one another, for example at different temperatures. One contact can act as a safety contact.

Preferred embodiments of the present invention will hereinafter be described, by way of example, with reference to the accompanying drawings, in which:

FIG. 1 is a section through a first embodiment of a switch of the invention,

FIG. 2 is a plan view of the spring of the switch of FIG. 1,

Figure 5:
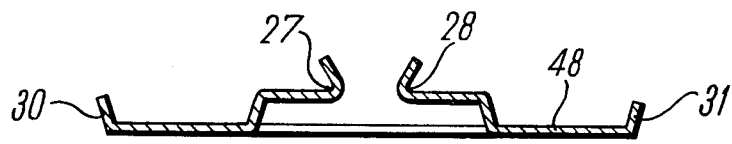
Figure 6:
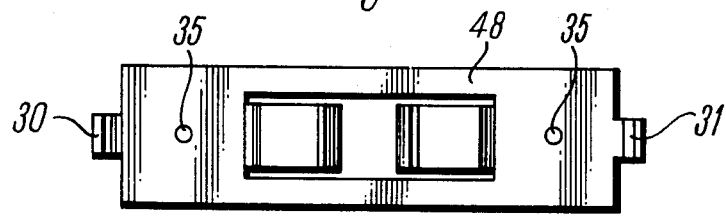
Figure 7:
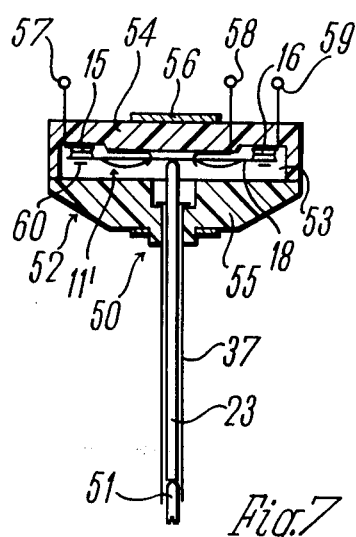
Figure 8:
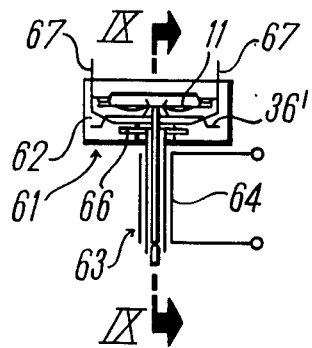
Figure 9:
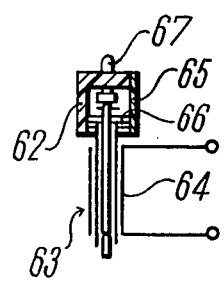
Figure 10:
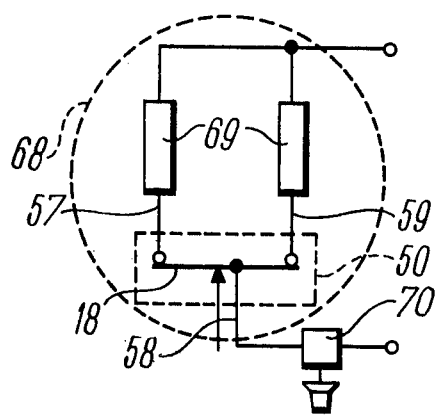
Figure 11:
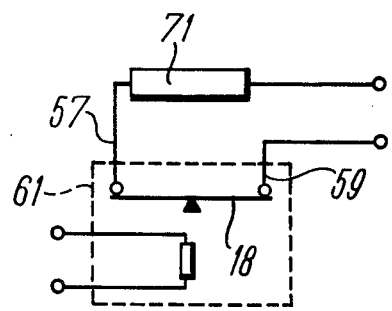
Figure 12:
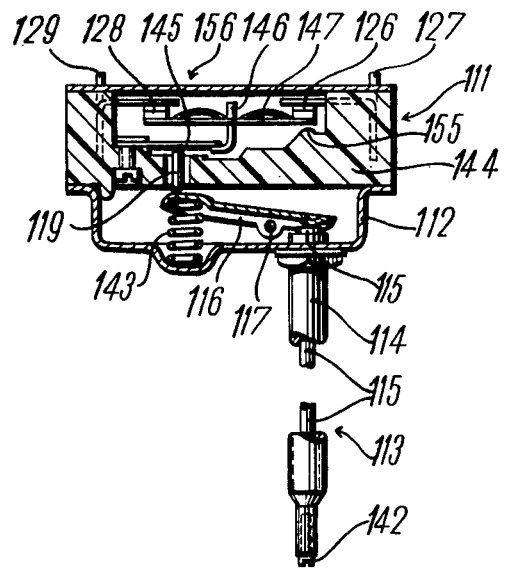
Figure 13:
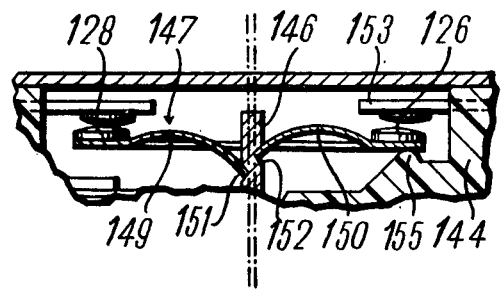
Figure 14:
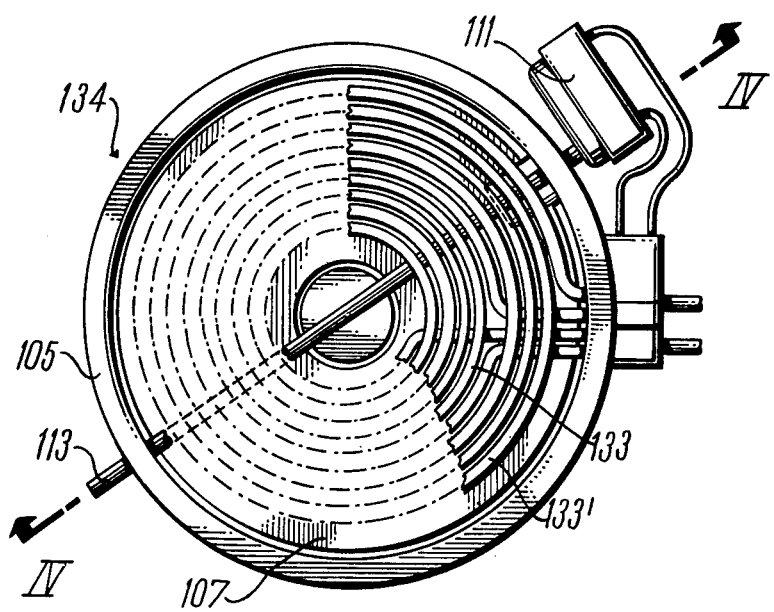
Figure 15:
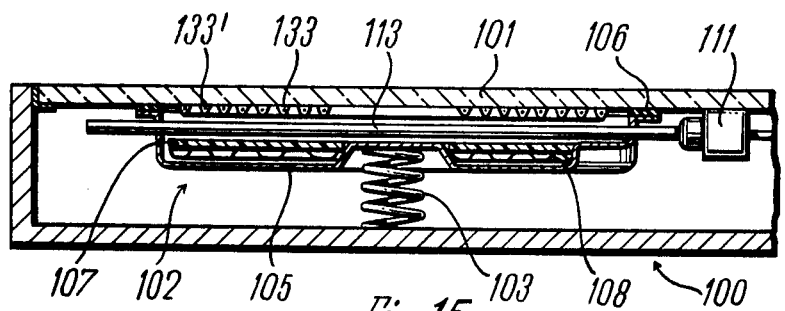
Figure 16:
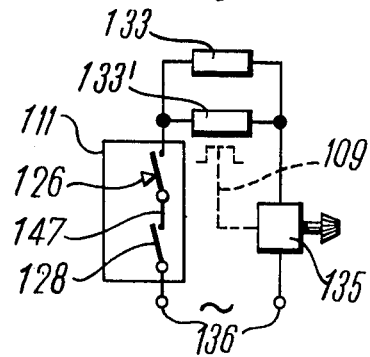

FIG. 3 is a diagrammatic representation of a second embodiment of a switch of the invention, FIG. 4 is an exploded, perspective view of a detail of a switch of FIG. 3, FIG. 5 is a longitudinal section through one embodiment of a support bearing carrier, FIG. 6 is a plan view of the support bearing carrier of FIG. 5, FIG. 7 is a diagrammatic representation of a thermostat incorporating a switch of the invention, FIG. 8 is a diagrammatic representation of a thermal relay incorporating a switch of the invention, FIG. 9 shows a section taken on the line IX—IX of FIG. 8, FIG. 10 shows an example of a circuit for the switch of FIG. 7, FIG. 11 shows an example of the connection of the switch used in FIGS. 8 and 9, FIG. 12 and is a section through a temperature limiter which is suitable for use in an electric cooking appliance, FIG. 13 shows a detail of FIG. 12, drawn to an enlarged scale, FIG. 14 is a plan view of a heating unit having a temperature limiter as shown in FIGS. 12 and 13, FIG. 15 is a diagrammatic section taken on the line IV—IV in FIG. 14, and FIG. 16 shows a circuit diagram.

The snap-action switch 11 illustrated in FIGS. 1 and 2 is received in a recess 13, open on one side, in a housing 12 which is made from an insulating material. The switch 11 is engaged in slots 14, and counter-contacts 15 and 16 are also fixed in slots 17.

The switch 11 and has a spring 18 whose configuration can be seen most clearly in FIG. 2. The spring 18 comprises a flat, elongate member made from thin spring material having good electrical conductivity, and carries contacts 19 and 20, one at each end thereof.

The spring 18 has a substantially flat resilient base member 21 having an impressed groove 22 extending transversely of the base member 21 at the centre thereof. The projecting side of the groove 22 is acted upon by an actuating member 23 of the switch 11. Two slots 29 are provided in the resilient base member 21 which has a substantially rectangular basic configuration. Two substantially rectangular spring tongues 24, 25 are connected to the resilient base member 21 at their ends nearest to the ends 26 of the spring 18. The free ends of the spring tongues 24 and 25 face the central groove 22.

The spring tongues 24, 25 are clamped under very high initial pressure in support bearings 27, 28 so that they attain the U-shaped configuration illustrated in FIG. 1. The bearings 27 and 28 engage the slots 29 in the resilient base member 21. The support bearings 27, 28 are located relatively close together, thus, they are close to the groove 22 which engages the actuating member 23. The spring tongues 24, 25 hold the central region of the resilient base member 21 under tension.

It will be seen that, when the switch is in the position illustrated the resilient base member 21 extends somewhat above the two support bearings 27, 28, so that the pressure exerted outwardly by the spring tongues 24, 25 presses the contacts 19, 20 against their corresponding counter-contacts 15, 16. However, when the actuating member 23 moves downwardly to assume the position illustrated by dash-dot lines in FIG. 1, the contacts 19, 20 snap away from the counter-contacts 15, 16 and abut against abutments 30, 31.

The support bearings 27, 28 are bent into the configuration illustrated in FIG. 1 from the sheet metal of support bearing carriers 32, 33. The spring tongues 24, 25 are received in the support bearings 27, 28 as knife-edged bearings.

The support bearing carriers 32, 33 are secured to a retaining bridge 34 which is common to the two support bearing carriers, for example, by spot welds 35. The abutments 30, 31 are formed by bending the support bearing carriers 32, 33 at their ends remote from the support bearings 27, 28. The retaining bridge 34 comprises a substantially straight portion of sheet metal whose outer ends have portions 36 which are bent at right angles and which are directed away from the side thereof facing the spring 18. The portions 36 are engaged in the slots 14 in the housing 12. Thus, an entire unit comprising the spring 18 with the contcts 19, 20, the support bearing carriers 32, 33 and the retaining bridge 34 can be preassembled, with the contacts 19, 20 abutting against the abutments 30, 31, and the unit can then be inserted into the recess 13 of the housing 12. Only the counter-contacts 15, 16 have to be mounted separately.

The central region of the retaining bridge 34 has an aperture 38 through which the actuating member 23 extends. In the embodiment illustrated, the actuating member 23 is a ceramic rod which has a low coefficient of thermal expansion and which is located in a sleeve 37 having a high coefficient of thermal expansion. The sleeve 37 is fixed in the aperture 38 by means of a flange on the sleeve 37, so that the expansion sleeve and the actuating member are also secured to the switch unit. The bottom ends (not shown in FIG. 1) of the sleeve 37 and the ceramic rod 23 abut against one another by way of an adjusting screw, so that the rod-shaped actuating member 23 can move downwardly when the expansion sleeve 37 expands due to an increase in temperature. The resilient base member 21 has an initial tension which ensures that the base of the groove 22 is always in contact with the actuating member 23. Thus, as a result of the initial tension, the resilient base member 21 follows the downward movement of the actuating member 23 and moves the contacts 19, 20 out of engagement with the counter-contacts 15, 16 either simultaneously or one after the other, according to the adjustment or setting of the switch. Current can be fed to the switch by way of the retaining bridge 34 and the support bearing carriers 32, 33 or, alternatively, by way of a termainal (not illustrated) mounted on the spring 18 in the region of the groove 22. It has been found that currents of high power can be fed to the spring 18, and thus to the contacts, if the spring 18 is made from highly conductive resilient bronze, despite the small contact areas on the support bearings 27, 28.

Thus, in the embodiment shown in FIG. 1, the actual switching body is formed by the housing 12 on the one hand and, on the other hand, by the retaining bridge 34 which is in turn secured to the housing 12.

The switch of the present invention described above has the advantage that only a small number of individual parts are required to provide a switch which has two switching contacts which can switch independently of one another. Additionally, the spatial requirements of the switch are small, the switch can be rapidly assembled, and, in particular, the switch has a small switching travel, for example, approximately 1/100 mm. The important feature in this respect is the short distance between the two support bearings 27, 28 and between the support bearings 27, 28 and the base of the groove 22. The present invention makes it possible to provide a temperature-sensitive switch in which a linear expansion system, for example the combination of an expansion sleeve 37 and a ceramic rod 23 which expands only slightly, acts directly upon the switch. The difference between switching on and switching off can be less than 10° C.

FIG. 3 shows, diagrammatically, an embodiment which has an over-all construction which substantially corresponds to that of the embodiment shown in FIG. 1. Similar parts in FIGS. 1 and 2 are provided with the same reference numerals. However, in the embodiment shown in FIG. 3 the spring 18, or its resilient base member, is not initially stressed downwardly, that is, towards the actuating member 23, but has an upwardly directed initial stress in its central region. A pull element 41 in the forn of a T-shaped portion of sheet metal is inserted through a slot 40 provided in the resilient base member 41 in the region of the groove 22. The horizontally extending limb of the T-shaped pull element 41 abuts against the groove 22, and the pull element 41 is pressed downwardly, that is in contact with the actuating member 23, by means of a leaf spring 42 mounted on the housing 12. The leaf spring 42 is engaged in a slot 43 in the pull element 41, so that the housing 42 fixes the pull element relative to the slot 40, and fixes the pull element 41 in position. Thus, the leaf spring 42 provides for the "external initial stressing" of the spring 18, frictional abutment being provided against the spring 18 and against the actuating member 23.

The spring tongues 24, 25 are bent upwardly in the embodiment shown in FIG. 3, although this does not have any fundamental effect upon the action of the switch. The switch is operated by way of the triangles of forces which are formed firstly by the resilient base member when in its prevailing position, secondly by the points of contact between the contacts and the counter-contacts, and thirdly by the support bearings.

In the embodiment shown in FIG. 3, the support bearing carriers 32, 33 can be adjusted by bending them slightly by means of adjusting screws 44 which are screwed into the retaining bridge 34. Furthermore, there is formed on the retaining bridge 34 an electrical connection plug in the form of a flat plug pin 45 onto which a corresponding plug connection sleeve 46 may be plugged. The embodiment shown in FIGS. 3 and 4 has the advantage that the spring 18 is not stressed to as great an extent as in FIG. 1, particularly in the case of very long expansion units which have a large amount of expansion travel. Although downward movement of the spring 18 beyond the "off" position can be prevented by a stop (not illustrated) which acts upon the spring 18 itself or upon the pull element 41, the spring 18 in the embodiment shown in FIG. 1 would be bend upwardly to a great extent upon cooling of the expansion sleeve. On the other hand, in the embodiment shown in FIG. 3, the pull element 41 is lifted from the spring 18 when the actuating member 23 is in its top position, so that the spring 18 is not bent upwardly more than is absolutely necessary. This latter advantage would also occur if, in the case of an upwardly initially stressed spring, a pull element were used which was mounted on the actuating member 23 in a tension-resistant manner. However, this would be more difficult to assemble and would thus not have all the advantages of the embodiment illustrated in FIG. 3.

FIGS. 5 and 6 show a preferred embodiment of the support bearing carriers which is particularly simple to manufacture. In the embodiment illustrated, the support bearing carriers are punched as a unit 48 from a rectangular strip of sheet metal, the tongues carrying the support bearings 27, 28 being punched out of a central region of the strip of sheet metal and being bent upwardly therefrom in the same manner as the spring tongues 24, 25 are punched from the spring 18. The support bearing carrier 48 is secured to the retaining bridge 34 by means of spot welds 35.

A temperature-sensitive switching element 50, including a switch of the present invention, is illustrated diagrammatically in FIG. 7. The switching element 50 may be used as a temperature limiter or as a temperature regulator depending upon the adjustment thereof and/or its circuit. Similar parts are again provided with the same reference numerals as used in previous Figures.

The expansion sleeve 37 and the rod 23 are supported with respect to one another at their outer ends by way of an adjusting screw 51. The switching element 50 has a housing 52 comprising an insulating member 54, a switch 11' being received in a recess 53 of the insulating member 54. A strap 56 holds the insulating member 54 together with an insulating member 55 which covers the recess 53. The expansion sleeve 37 is fixed in a central opening in the insulating member 55 by means of a flange, and the actuating rod 23 presses directly against the central actuating point of the spring 18.

The switch incorporated in the switching element 50 is modified relative to that shown in FIG. 1 in that the support bearing carriers, connected either directly or to a retaining bridge 34, are mounted on the insulating member 54 which also carries the counter-contacts 15, 16 and all the electrical terminals 57, 58, 59. However, the construction of the spring 18 is the same as that shown in FIG. 1. The abutments 60 are formed by members projecting into the housing opening 53.

A switching element 61 which is shown in FIGS. 8 and 9, shows how small and compact a switching element incorporating a switch of the present invention may be. The switching element 61 is in the form of a thermal relay and carries a heating element 64 (indicated diagrammatically) which is mounted on the expansion member 63 formed by the sleeve and the actuating rod. The heating element 64 can be switched on independently of the electrical circuit through the switch 11.

The switching element 61 has a housing 62 which is manufactured from a single piece of insulating material and has a recess which is open towards the side and which is closed by means of a cover 65. The switch 11 received in the recess of housing 62 has the same construction and is mounted in the same manner as the switch shown in FIG. 1, and most of the details of the housing 62 are the same as the housing 12 in FIG. 1. The only difference is that the portions 36' of the retaining bridge are bent twice through approximately 90° to ensure satisfactory fixing of the retaining bridge in so small a switch. Furthermore, the expansion sleeve is not hooked directly into the retaining bridge, but into a sheet metal portion 66 which can be slid into slots in the housing when the switching element is being assembled. The expansion sleeve is thus electrically insulated from the spring 18. Alternatively, the retaining bridge could be provided with a recess open at one side instead of a central aperture 38, so that the expansion element 63, togeher with the sheet metal member 65, can be inserted after, for example, the switch has been fitted in the housing. The switch is fully sealed after the cover has been mounted.

Although the switch has two contacts, it has, in the embodiment shown in FIGS. 8 and 9, two terminals 67 of the electrical circuit to be controlled by the switch. This will be expalined further with reference to FIG. 11.

FIG. 10 shows the circuit of the switching element 50 (FIG. 7) combined with an electric hot plate 68 indicated by a circle shown in dashed lines. The electric hot plate 68 has two heating conductors 69 and is regulated by means of an energy regulator 70. Current is supplied to the spring 18 of the switch by way of the connection 58, and the two heating conductors 69 are connected to the output connections 57, 59 independently of one another. When the expansion element is exposed to the temperature of the hot plate, and the two sets of contacts of the switch have been adjusted so that they switch one after the other at a specific difference in temperature, one heating conductor 69 is switched off when the temperature approaches the limiting temperature, and subsequently the other heating conductor is switched off. It is, of course, also conceivable to switch off only individual heating conductors in the case of a hot plate having three heating conductors. However, it is also possible to so adjust the two contacts that they theoretically switch at the same temperature. In any event, there is the advantage that double safety against exceeding of the maximum admissible temperature is obtained, which is very advisable in view of the present-day custom of fitting hot plates in the immediate vicinity of inflammable parts. There is also the advantage that each of the contacts only has to switch a portion of the full power. It is also possible to connect the two contacts, i.e. the connections 57 and 59, in series, as is shown, for example, in FIG. 11. In this case, there is no need for a supply lead for the spring 18, and thehot plate is switched off upon the switching of the first of the two contacts. The second contact then acts as a safety contact in the event of one of the contacts sticking or being bridged by foreign bodies.

FIG. 11 shows an electrical circuit for the thermal relay illustrated in FIGS. 8 and 9. Here, the load 71 to be switched is connected in series with the two contacts. An important feature of the embodiments of the switching elements 50 and 61 shown in FIGS. 7 to 9 is that all connections can be made in a simple and uncomplicated manner by plug contacts on the side remote from the expansion element.

It is possible to combine the temperature limiter and the thermal relay described above, by, for example, providing a temperature limiter of a hot plate with an additional heating coil on the expansion element. The expansion element can be acted upon by a separate circuit which is switched by a thermal switch on a different part of the cooker or kitchen appliance, or the like. When heating the expansion element by this separate heating resistor, switching-off is effected in the same manner as in the case of the thermal relay 61. Thus, remote control of the temperature of the hot plate can be achieved. A particular advantage to be emphasized is the construction of the temperature limiter which operates with contacts which have been adjusted to switch off at different temperatures. With this embodiment it is possible to work up to a maximum temperature witout over-shooting this maximum temperature. Thus, the first contact is arranged to switch off a large portion of the power before the maximum temperature is reached and the maximum temperature is approached slowly using the residual power. Thus, this embodiment is particularly suitable for cooperation with energy regulators or control devices adapted to switch in a graduated manner, for electric hot plates or other electric cooking appliances. The temperature limiter is then set to the maximum temperature which the hot plate is to attain, for example, when frying, and this maximum temperature is attained rapidly, as is required when frying, but is not exceeded when the hot plate is inadvertently operated under no-load. It is also readily possible to construct one of the described switching elements, particularly the thermal relay 61, as a change-over switch by providing the switch with a second contact instead of at least one of the abutments.

The thermostat 111 illustrated in FIGS. 12 and 13 has a housing 112 and a temperature sensor 113 mounted on the housing 112. The temperature sensor 113 is in the form of a thermal expansion element. The expansion element comprises, for example, a tubular sleeve 114 which is made from stainless steel and whose bottom end is connected to a central rod 115, by way of an adjusting screw 142 if required. The rod 115 may be made from a ceramic material having a very low coefficient of thermal expansion, while the sleeve 114 has a higher coefficient of thermal expansion.

A two-arm lever 116 is pivotally arranged on a spindle 117 in the housing 112 of the temperature limiter 111. One arm of the lever 116 presses against the rod 115, whilst the other arm rests on a thrust rod 119 which extends through an opening in a carrier 144 which is made from insulating material. The side of the carrier 144 remote from the lever 116 has a depression in which a switch 156 is received. This snap-action switch 156 has a spring 147 which carries two bent-up resilient tongues which abut against an arm 146. The arm 146 is part of an L-shaped lever 145 mounted by way of a leaf spring. The portion of the lever 145 remote from the arm 146 is mounted on the carrier 144. The thrust rod 119 abuts against the lever 145 and it can thus open the switch 156 by pressure directed upwardly as shown in the drawings. A working contact 126 is arranged at one end of the spring 147. The counter-contact for the contact 126 is mounted on the carrier 144 and is electrically connected to a terminal 127. A safety contact 128 is arranged at the other end of the spring 147 and cooperates with a counter-contact which is mounted on the housing so as to be insulated relative thereto and which is electrically connected to a terminal 129.

The details of the switch of the thermostat 111 can be seen most clearly in FIG. 13 which illustrates the switch in one working position. Two external continuous connection members and the two spring tongues 149, 150 are separated by two slots in the spring 147 which is made from thin spring material. The spring tongue 149 is located to the same side of the spring 147 as the safety contact 28 and acts to actuate the safety contact 28. The spring tongue 150 acts to actuate the working contact 126 and is located to the same side of the spring 147 as the working contact 126. The spring tongues 149, 150 are bent arcuately upwardly and have knife-edges 151 which are directed towards one another. Each knife-edge 151 abuts a respective knife-edge support 152, the supports 152 being formed by indentations on two oppositely located sides of the arm 146. The knife-edge supports 152 are located at different positions on the arm 146, for example, in the embodiment shown, the knife-edge support for the spring tongue 150 for the working contact 126 is located higher, that is, more towards the position of equilibrium, than the knife-edge support for the spring tongue 149 for the safety contact 128.

The spring 147 is freely mounted, that is, it is held in position merely by abutment of its contacts 126, 128 against the corresponding counter-contacts and by the support of the spring tongue 149, 150 by the arm 146. When the working contact 126 is open, the contact gap is limited to a relatively small value by means of a stop 155 provided on the carrier 144. By contrast, there is no limit to the size of the contact gap of the safety contact 128.

It will be seen from the circuit diagram in FIG. 16 that the contacts 126 and 128 are connected in series with the spring 147 acting as a conductor in a conventional manner. As shown in FIG. 16, the entire temperature limiter 111 may be electrically connected in series with two parallel-connected heating resistors 133, 133' and with an adjustable regulator 135. As shown in FIG. 14, the two heating resistors 133, 133' form part of a heating unit 134 of an electric cooking appliance. Thus, current fed from a power supply 136 to the heating unit 134 flows by way of the temperature limiter 111. The regulator 135 can be any suitable regulator, however, in a preferred embodiment the regulator 135 makes it possible to feed power to the heating resistors 133, 133' in a continuous manner.

The contacts 126 and 128 of the switch of the temperature limiter 111 are normally closed, and, when the heating unit 134 is switched on by means of the regulator 135, current flows by way of these contacts to the heating resistors 133, 133'. The sleeve 114 expands as it is heated to a greater extent than the rod 115 which has a lower coefficient of thermal expansion, and so the lever 116 is pivoted in a clockwise direction and presses against the lever 145 by way of the thrust rod 119. Thus, the arm 146 is moved upwardly and also slightly towards the safety contact 128 as is indicated in dash-dot lines in FIG. 13. The movement of the arm 146 will cause tension in the spring tongue 150 which will, at one point, snap the working contact 126 out of contact with its counter-contact 153. The working contact 126 will then abut the stop 155. As the heating unit 134 cools the arm 146 of the lever 145 will move downwardly and towards the contact 126, and again upon the tension in the spring tongue 150 will cause the spring tongue 150 to snap the working contact 126 back into contact with its counter-contact 153. Thus, the supply circuit to the heating unit 134 will be interrupted by the switch of limiter 111 whenever the maximum temperature is attained. As is indicated by the dash-dot lines in FIG. 13, the spring 147 is moved back and forth substantially in its longitudinal direction upon switching of the working contact 126, and also upon every movement which is caused by differing temperatures at the sensor 113 which are below the limiting temperature. This causes the surfaces of the contacts to move one against the other. This prevents the welding or sticking of the safety contact 128 so that it is still ready for operation even when it has not been used for years.

If the working contact 126 does not open, for example, because of welding or sticking, even though the knife-edge support 152 for the spring tongue 150 has long since moved beyond the point at which the working contact 126 should have opened, the lever 145 is further pivoted by further expansion of the sleeve 114, and the arm 146 is displaced upwardly until the knife-edge support 152 for the spring tongue 149 is subjected to tension and snaps open the safety contact 128. As a result of the large contact gap at the safety contact, the spring 147 assumes a position from which is cannot be returned to the original position even when the element 113 cools, since the knife-edge support 151 no longer moves downwardly past the "snap line" indicated, for example, by the longitudinal extension of the spring 147 in FIG. 13. When the safety contact 128 has opened, the heating unit 134 can only be switched on against the temperature limiter 111 has been repaired and the working contact 126 is operating again.

The heating unit 134 is shown in more detail in FIGS. 14 and 15. An electric cooking appliance 100, partially illustrated in FIG. 15, has a top plate 101 which is resistant to heat and which is particularly resistant to thermal shock. The top plate 101 may be made from glass, a glass-like material, or a ceramic material, and is preferably a glass ceramic. A plurality of heating units 102 are arranged below this top plate 101, and as is indicated diagrammatically in FIG. 15, they are pressed by means of a spring 103 against the underside of the plate so that each heating unit 102 defines a cooking location. The heating units 102 are units which are ready for fitting and which can readily be removed in their entirety. Their heating elements 133, 133' are arranged in a carrier shell and comprise spirally coiled tubular heating elements having a substantially triangular cross section which are flexible in themselves. Switable heating elements are further described in the German Offenlegungsschrift No. 2,205,132. The tops of the heating elements 133, 133' are pressed firmly against the underside of the top plate 101 by pressing the lateral flanges of a carrier shell 105, in which the heating elements are arranged, against the underside of the plate 101 by way of a resilient intermediate layer 106. This results in a large amount of play so that the heating elements, despite their rigid arrangement within the carrier shell, are firmly pressed against the underside of the top plate 101. The carrier shell 105 has a substantially circular configuration and its centre is provided with a centering indentation acting as a point of application for the force of the spring.

In the illustrated example, the heating elements 133, 133' are in the form of two spirally coiled annular portions which are located one within the other but which are connected in parallel (FIG. 16). Alternatively, they may be connected in series. In an alternative embodiment the heating elements may be spirally coiled from a continuous tubular heating element so that it is unnecessary to divide them into two annular regions.

The temperature sensor 113 of the temperature limiter 111 extends parallel to the top plate 101 through the heating unit 102, below the heating elements 133, 133' and above an insulation comprising a highly heat-resistant insulating material 107 and a corrugated aluminium foil 108. As may be seen in FIG. 14, the temperature sensor 113 extends in the direction of a diameter, that is, it passes through the centre point of a circular heating unit 102. The ends of the temperature sensor 113 are held in the carrier shell 105. Thus, all regions of the heating unit 102 are sensed as uniformly as possible by the temperature sensor 113. However, if required the temperature sensor 113 may be arranged somewhat off centre in order to leave space, for example, a temperature sensor 109 which is indicated diagrammatically by broken lines in FIG. 16 and which influences the regulator 135 which, in this case, is then in the form of a temperature regulator and not in the form of an energy regulator. Thus, the regulator 135 could be used to obtain a certain adaptation of power to the differing working conditions, so that the temperature limiter 111 needs to act only as an upper limitation.

It has hitherto been assumed that the top plate 101, which operates at a working temperature only slightly below the temperature which leads to damage, can be properly monitored only by means of a sensor which abuts directly against the underside of the glass ceramic plate. Unexpectedly, it has been found that very effective temperature limitation of the maximum temperature for the top plate 101 can be provided by means of a rod-shaped temperature sensor which extends at a relatively great distance from the plate and even below the heating elements arranged relatively close together. Tests have shown that it is even possible to use the temperature limiter as a working regulator by operating the heating unit only with energy regulation without any other temperature regulation, i.e. the heating unit is heated to so great an extent that it is continuously switched on and off by the temperature limiter during operation.

The function of the temperature limiter is distinguished by the fact that, during a normal cooking operation with a pot placed thereon, the power input was 84 percent that is, the heating unit was switched on for 84 percent of the time and was switched off by the temperature limiter for 16 percent of the time, whilst, in the most unfavourable case, with a badly abutting and reclective pot which does not receive the power efficiently, a relative "on" period (relative power absorption) of only 30% was obtained. The temperatures on the top plate which was glass ceramic were in the region between 500° C and 600° C and were accurately maintained constant to 10°. Very good regulation could be obtained even in a test with a displaced cooking pot, i.e. with power absorption only in a part region of the heated cooking surface, without inadmissible temperatures occurring in the region not covered by the cooking pot.

As already mentioned, the temperature limiter 111 operates in an excellent manner even if spaced by a relatively great distance from the glass ceramic plate and the heating elements located therebetween. In particular, the time lag is very small. It has a simple and robust construction, and only two supply leads are required for the heating unit, the temperature limiter being connected in one of the two supply leads. The temperature limiter is arranged directly on the heating unit and does not need any separate connections or separate fitting. It is insensitive to temperature and is very reliable both mechanically and electrically. Owing to the fact that it is arranged below the heating elements, the sensor requires no largely unheated area of the surface of the cooking location which is to be covered as densely as possible by heating elements, so that is is possible to obtain a greater heat throughput with the same temperature.

We claim:

1. An electrical switch comprising a spring being made from resilient flat material and having a resilient base portion intermediate end portions, at least one contact carried on each portion, counter-contacts for engagement with respective contacts, spring tongues carried by said spring, the spring tongues being directed in opposite directions relative to one another, support bearings mounted in a fixed position with respect to said counter-contacts and adapted to support the ends of the spring tongues, the spring tongues being under stress and the ends of the tongues supported by the support bearings being directed towards one another, and an actuating member, moveable with respect to said support bearings, for engaging the resilient base portion of said spring and moving said contacts towards or away from said counter-contacts.

2. The switch recited in claim 1, in which said support bearings, are spaced a short distance apart, and in which an actuating point is provided on said resilient base portion of said spring between said support bearings, said actuating member engaging the spring at the actuating point.

3. The switch recited in claim 1, further comprising electrical terminal means connected to the support bearings.

4. The switch recited in claim 1, further comprising electrical terminal means connected exclusively to said contacts.

5. The switch recited in claim 1, in which the actuating member comprises a rod having a low coefficient of thermal expansion and an expansion sleeve having a high coefficient of thermal expansion, the rod extending within the expansion sleeve.

6. The switch recited in claim 5, in which the actuating member acts directly upon said spring without transmission.

7. The switch recited in claim 5, in which an electrical heating device is carried by the expansion sleeve and the switch is a thermal relay.

8. The switch recited in claim 1, in which the support bearings are adjustable independently of one another.

9. The switch recited in claim 1, in which the actuating member is a rod extending into the housing and the spring tongues are supported at oppositely located sides and at different locations on said rod.

10. The switch recited in claim 9, in which the spring is supported only by means of the support bearings of the spring tongues and by means of the abutment of said contacts against the respective counter-contacts.

11. The switch recited in claim 1 in which the position of said support bearings is arranged to cause the contacts on the different ends of the spring to move said contacts toward or away from said counter-contacts at different positions of the actuating member.

12. An electrical switch comprising a housing, a spring supported in the housing, the spring being made from resilient flat material and having a resilient base portion intermediate two end portions, at least one contact carried on each portion, counter-contacts carried by the housing for engagement with respective contacts, two spring tongues carried by said spring, the two spring tongues being directed in opposite directions relative to one another, two support bearings adapted to support the ends of the two spring tongues, the two spring tongues being under stress and the ends of the tongues supported by the support bearings being directed towards one another, actuating means engaging said spring for moving said contacts, an expansion element for actuating said actuating means, the expansion element comprising a rod having a low coefficient of thermal expansion and an expression sleeve having a high coefficient of thermal expansion, the rod extending within the expansion sleeve, the switch being associated with an electrical cooking appliance so that the expansion element is subjected to the temperature of the electrical cooking appliance, an electrical power supply circuit for said electrical cooking appliance, one of the two contacts on said spring acting as a working contact to interrupt said electrical power supply circuit when a predetermined limit temperature has been attained, and the other contact on said spring acting as a safety contact to interrupt said electrical power supply circuit when a second temperature, which is substantially greater than said limit temperature, is attained.

13. The switch recited in claim 12, in which when said second temperature hs been attained the safety contact permanently interrupts the electric power supply circuit.

14. The switch recited in claim 12, in which the spring is so arranged within the housing that the working contact can return to its original position but the safety contact cannot.

15. The switch recited in claim 12, in which a first contact gap is defined between the safety contact and the housing, and a second contact gap is defined between the working contact and the housing, the first contact gap being larger than the second contact gap.

16. The switch recited in claim 12, in which the safety contact is displaceable slightly transversely of its lifting direction upon actuating of the working contact or upon the working movement of the expansion element.

17. The switch recited in claim 16, in which the actuating member comprises a lever having an arm carrying the support bearings for the sprong tongues and effects movement in a direction having a component along the length of the spring upon the working movement of the arm effected substantially at right angles to the spring.

18. In a heating unit for a plate which is made from a material from the group consisting of glass, glass-like materials and ceramics, the heating unit being arranged below the plate and comprising a carrier shell and heating elements, the heating elements being arranged within the carrier shell and being pressed against the plate, the switch recited in claim 12, the expansion element of the switch extending transversely through the heating unit along the side of the heating elements remote from the plate, the switch acting as a temperature limiter for the heating elements.

19. The switch recited in claim 18, in which an insulation is fitted in the carrier shell, and the expansion element extends between the heating element and the insulation.

20. The switch recited in claim 18, in which the expansion element is linear and the heating unit is circular, the expansion element being arranged along a diameter of the heating unit.

21. The switch recited in claim 18, in which the heating elements are tubular and are spirally coiled and the expansion element extends immediately adjacent the underside of the spirally coiled heated elements.

22. An electrical switch comprising a housing, a spring supported in the housing, the spring being made from resilient flat material and having a resilient base portion intermediate two end portions, at least one contact carried on each portion, counter-contacts carried by the housing for engagement with respective contacts, two spring tongues carried by said spring, the two spring tongues being directed in opposite directions relative to one another, two support bearings adapted to support the ends of the two spring tongues, the two spring tongues being under stress and the ends of the tongues supported by the support bearings being directed towards one another, an actuating member for engaging said spring and moving said contacts towards or away from said counter-contacts and an expansion element communicating with said actuating member and comprising a rod having a low coefficient of thermal expansion and an expansion sleeve having a high coefficient of thermal expansion, the rod extending within the expansion sleeve, said expansion element being subjected to the temperature of an electrical cooking appliance, and one of the two contacts on said spring acting as a working contact to interrupt an electrical power supply to the electrical cooking appliance when a predetermined limit temperature has been obtained and the other contact acting as a safety contact to switch off the power supply at a second temperature which is substantially greater then said limit temperature.

23. The switch recited in claim 22 wherein there is additionally provided an actuating linkage interconnecting said expansion element and said actuating member, said linkage comprising a two arm lever pivotally mounted in said housing.

24. The switch recited in claim 11 wherein said actuating member comprises the end of said rod.

25. The switch recited in claim 23, in which an electrical heating device is carried by the expansion sleeve and the switch is a thermal relay.

26. An electrical switch comprising a housing, a spring supported in the housing, the spring being made from resilient flat material and having a resilient base portion intermediate two end portions, at least one contact carried on each portion, counter-contacts carried by the housing for engagement with respective contacts, two spring tongues carried by said spring, the two spring tongues being directed in opposite directions relative to one another, two support bearings ridgedly arranged in the switch housing and adapted to support the ends of the two spring tongues, the two spring tongues being under stress and the ends of the tongues supported by the support bearings being directed towards one another, and an actuating member carried by said switch housing independently of said support bearings for engaging the resilient base portion of said spring and moving said contacts towards or away from said counter-contacts.

27. The switch recited in claim 26, further comprising a common retaining bridge fixed to said switch housing, and support bearings carriers arranged on said common retaining bridge, the support bearings being carried by said support bearing carriers.

28. The switch recited in claim 27, comprising an angled portion on the support bearing carriers, the angled portion forming an abutment for the spring when the respective contact is open.

29. The switch recited in claim 27, comprising an angled portion on the retaining bridge, the angled portion forming an abutment for the spring when the respective contact is open.

30. The switch recited in claim 27, in which an adjusting screw is screwed into the retaining bridge, and at least one support bearing carrier abuts said adjusting screw.

31. The switch recited in claim 27, in which the spring and its contacts, and the support bearing carriers and retaining bridge form an integral unit.

32. An electrical switch comprising a housing, a spring supported in the housing, the spring being made from a resilient flat material and having a resilient base portion intermediate two end portions, at least one contact carried on each portion, counter-contacts carried by the housing for engagement with respective contacts, two spring tongues carried by said spring, the two spring tongues being directed in opposite directions relative to one another, two support bearings adapted to support the ends of the two spring tongues, the two spring tongues being under stress and the ends of the tongues supported by the support bearings being directed towards one another, an actuating member, moveable with respect to said support bearings, comprising a pull element which engages behind the resilient base member of the spring, and biasing means in addition to said actuating member for pressing said pull element against said actuating member, said pull element engaging said spring and moving said contacts toward or away from said counter-contacts.

33. The switch recited in claim 32, in which said biasing means comprises a leaf spring connected to the pull element and to the housing.

* * * * *